United States Patent
Chu

(10) Patent No.: US 10,682,901 B2
(45) Date of Patent: Jun. 16, 2020

(54) LIGHT-DIMMABLE GLASS, CONTROLLABLE LIGHT SHIELDING DEVICE, CONTROLLABLE LIGHT SHIELDING METHOD, AND VEHICLE

(71) Applicant: BOE TECHNOLOGY GROUP CO., LTD., Beijing (CN)

(72) Inventor: Xiao Chu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/741,910

(22) PCT Filed: May 12, 2017

(86) PCT No.: PCT/CN2017/084154
§ 371 (c)(1),
(2) Date: Jan. 4, 2018

(87) PCT Pub. No.: WO2018/006652
PCT Pub. Date: Jan. 11, 2018

(65) Prior Publication Data
US 2019/0118624 A1   Apr. 25, 2019

(30) Foreign Application Priority Data
Jul. 7, 2016  (CN) .......................... 2016 1 0532358

(51) Int. Cl.
*B60J 3/04*      (2006.01)
*G02F 1/133*    (2006.01)
(Continued)

(52) U.S. Cl.
CPC ................ *B60J 3/04* (2013.01); *G02F 1/137* (2013.01); *G02F 1/13318* (2013.01);
(Continued)

(58) Field of Classification Search
CPC ......... B60J 3/04; B60J 1/02; B60J 1/08; B60J 1/18; G02F 1/13318; G02F 1/163;
(Continued)

(56) References Cited

U.S. PATENT DOCUMENTS

2006/0158715 A1*  7/2006  Furusawa .................. B60J 3/04
                                                                    359/265

FOREIGN PATENT DOCUMENTS

CN        201127131 Y      10/2008
CN        102241235 A  *  11/2011
(Continued)

OTHER PUBLICATIONS

International Search Report and Written Opinion for Application No. PCT/CN2017/084154, dated Jul. 26, 2017, 10 Pages.

*Primary Examiner* — Nathanael R Briggs
*Assistant Examiner* — William D Peterson
(74) *Attorney, Agent, or Firm* — Brooks Kushman P.C.

(57) ABSTRACT

Light-dimmable glass, a controllable light shielding device, a controllable light shielding method and a vehicle are provided. The light-dimmable glass includes a plurality of light-dimmable regions and a plurality of light dimmers each arranged on a respective one of the plurality of light-dimmable regions. Each of the light dimmers is capable of being controlled individually so as to change its light transmittance, thereby to adjust a light transmittance of the corresponding light-dimmable region where the light dimmer is located.

16 Claims, 5 Drawing Sheets

(51) Int. Cl.
*G02F 1/137* (2006.01)
*G02F 1/163* (2006.01)
*G02F 1/15* (2019.01)
*B60J 1/02* (2006.01)
*B60J 1/08* (2006.01)
*B60J 1/18* (2006.01)
*G02F 1/1333* (2006.01)

(52) U.S. Cl.
CPC ................. *G02F 1/163* (2013.01); *B60J 1/02* (2013.01); *B60J 1/08* (2013.01); *B60J 1/18* (2013.01); *G02F 1/15* (2013.01); *G02F 2001/13312* (2013.01); *G02F 2001/133302* (2013.01); *G02F 2201/58* (2013.01)

(58) Field of Classification Search
CPC .. G02F 2001/13312; G02F 1/137; G02F 1/15; G02F 2001/133302; G02F 2201/58
USPC ......................................................... 349/16
See application file for complete search history.

(56) References Cited

FOREIGN PATENT DOCUMENTS

| | | |
|---|---|---|
| CN | 102241235 A | 11/2011 |
| CN | 104626937 A | 5/2015 |
| CN | 106200187 A | 12/2016 |
| JP | 2002067690 A | 3/2002 |
| JP | 2009143470 A | 7/2009 |

\* cited by examiner

LIGHT-DIMMABLE GLASS, CONTROLLABLE LIGHT SHIELDING DEVICE, CONTROLLABLE LIGHT SHIELDING METHOD, AND VEHICLE

CROSS-REFERENCE TO RELATED APPLICATIONS

This application is the U.S. national phase of PCT Application No. PCT/CN2017/084154 filed on May 12, 2017, which claims priority to Chinese Patent Application No. 201610532358.8 filed on Jul. 7, 2016, which are incorporated herein by reference in their entireties.

TECHNICAL FIELD

The present disclosure relates to the field of controllable dimming technology, in particular to light-dimmable glass, a controllable light shielding device, a controllable light shielding method, and a vehicle.

BACKGROUND

In the related art, a light-shielding plate for a vehicle needs to be adjusted mechanically and manually. Especially, in the case that a running direction of the vehicle changes and a light-shielding position of the light-shielding plate needs to be adjusted manually to prevent light disturbance, the driving safety may be adversely affected.

In addition, such a light shielding device capable of adjusting a light transmittance automatically also needs to be adopted in some other fields, e.g., a viewing room where a light-transmitting or light-shielding function needs to be selected according to the practical need, or a bathroom which needs to be shielded or not shielded according to the practical need. However, currently there is no controllable light-shielding technology capable of adjusting the light transmittance automatically in a better manner.

SUMMARY

A main object of the present disclosure is to provide light-dimmable glass, a controllable light shielding device, a controllable light shielding method and a vehicle, so as to at least partially solve the problem in the related art where a light-shielding position of a mechanical-type light-shielding plate needs to be adjusted manually.

In one aspect, the present disclosure provides in some embodiments light-dimmable glass, including a plurality of light-dimmable regions and a plurality of light dimmers each arranged on a respective one of the plurality of light-dimmable regions. Each of the light dimmers are capable of being controlled individually so as to change its light transmittance, thereby to adjust a light transmittance of the corresponding light-dimmable region where the light dimmer is located.

In a possible embodiment of the present disclosure, the light-dimmable glass further includes a glass substrate, the light dimmers are electrochromic units arranged in an array form on the glass substrate, and each of the electrochromic units is capable of being controlled individually so as to change its color and light transmittance.

In a possible embodiment of the present disclosure, the light-dimmable glass includes liquid crystal light-dimmable glass which includes two glass substrates arranged opposite to each other, the light dimmers are liquid crystal membranes arranged in an array form between the two glass substrates, and a light transmittance of each of the liquid crystal membranes changes by adjusting a voltage applied to the liquid crystal membrane.

In another aspect, the present disclosure provides in some embodiments a controllable light shielding device including the above-mentioned light-dimmable glass, a light intensity detector configured to detect a light intensity of light passing through the light-dimmable glass, and a light transmittance controller configured to adjust a light transmittance of a light-dimmable region in accordance with the light intensity.

In a possible embodiment of the present disclosure, in the case that the controllable light shielding device is applied to a vehicle, the light intensity detector is further configured to detect a light intensity of light passing through the light-dimmable glass into an interior of the vehicle.

In a possible embodiment of the present disclosure, the light intensity detector is further configured to detect a maximum light intensity of the light passing through the light-dimmable glass, determine a maximum light intensity direction as a light transmission direction of the light with the maximum light intensity, output a transmission control signal, the maximum light intensity and the maximum light intensity direction. The light transmittance controller is electrically connected to the light intensity detector and further configured to, upon the receipt of the transmission control signal, determine a to-be-dimmed region in accordance with the maximum light intensity direction and a position of the light intensity detector, and reduce the light transmittance of the to-be-dimmed region. The to-be-dimmed region is a light-dimmable region where a coincident point of the light with the maximum light intensity and the light-dimmable glass is located.

In a possible embodiment of the present disclosure, the light transmittance controller is further configured to compare the maximum light intensity with a predetermined light intensity threshold, and in the case that the maximum light intensity is smaller than the predetermined light intensity threshold, control the light transmittance of the to-be-dimmed region to be an initial light transmittance. The initial light transmittance is a light transmittance of the to-be-dimmed region whose light transmittance has not been dimmed yet.

In a possible embodiment of the present disclosure, the light intensity detector is further configured to determine the light transmission direction of the light with the maximum light intensity with its position as a point of origin. The light transmittance controller includes a signal generator and a plurality of signal receivers, and each of the signal receivers is arranged on a respective one of the light dimmers. The signal generator is arranged at the light intensity detector, and coordinates of a position of the signal generator coincide with coordinates of a position of the light intensity detector. The signal generator is electrically connected to the light intensity detector and configured to, upon the receipt of the transmission control signal, transmit an adjustment control signal to the light-dimmable glass in the maximum light intensity direction. The signal receiver which has received the adjustment control signal is configured to control the corresponding light dimmer to reduce the light transmittance.

In a possible embodiment of the present disclosure, the light intensity detector is further configured to detect the maximum light intensity of the light passing through the light-dimmable glass at different detection time points, so as to determine the corresponding maximum light intensity direction as the light transmission direction of the light with the maximum light intensity. The controllable light shielding device further includes a storage circuit and a comparator. The storage circuit is electrically connected to the light intensity detector and configured to store therein a first maximum light intensity direction, a second maximum light intensity direction and a second maximum light intensity. The first maximum light intensity direction is a maximum light intensity direction determined by the light intensity detector at a previous detection time point, the second maximum light intensity direction is a maximum light intensity direction determined by the light intensity detector at a current detection time point, and the second maximum light intensity is a maximum light intensity detected by the light intensity detector at the current detection time point. The comparator is electrically connected to the storage circuit and the light intensity detector, and configured to compare the first maximum light intensity direction with the second maximum light intensity direction, output a conversion control signal in the case that the first maximum light intensity direction is different from the second maximum light intensity direction, and output a maintenance control signal in the case that the first maximum light intensity direction is identical to the second maximum light intensity direction. The light transmittance controller is electrically connected to the comparator, and further configured to, upon the receipt of the maintenance control signal, determine a first to-be-dimmed region and maintain a light transmittance of the first to-be-dimmed region, and upon the receipt of the conversion control signal, determine a second to-be-dimmed region and reduce a light transmittance of the second to-be-dimmed region. The first to-be-dimmed region is a light-dimmable region where a coincident point of the light with the first maximum light intensity direction and the light-dimmable glass is located, and the second to-be-dimmed region is a dimmable region where a coincident point of the light with the second maximum light intensity direction and the light-dimmable glass is located.

In a possible embodiment of the present disclosure, the light transmittance controller is further configured to, upon the receipt of the conversion control signal, increase the light transmittance of the first to-be-dimmed region.

In a possible embodiment of the present disclosure, the comparator is further configured to receive the second maximum light intensity from the storage circuit, compare the second maximum light intensity with the predetermined light intensity threshold, and output a light transmittance control signal in the case that the second maximum light intensity is smaller than the predetermined light intensity threshold. The light transmittance controller is further configured to, upon the receipt of the light transmittance control signal, control the light transmittance of the second to-be-dimmed region to be an initial light transmittance. The initial light transmittance is a light transmittance of the to-be-dimmed region whose light transmittance has not been dimmed yet.

In a possible embodiment of the present disclosure, the light intensity detector is further configured to determine a corresponding maximum light intensity direction as the light transmission direction of the light with the maximum light intensity with its position as the point of origin. The light transmittance controller includes a signal generator and a plurality of signal receivers. The signal generator is arranged at the light intensity detector, and coordinates of a position of the signal generator coincide with coordinates of a position of the light intensity detector. Each of the signal receivers is arranged on a respective one of the light dimmers. The signal generator is electrically connected to the comparator, and configured to transmit a first adjustment control signal toward the light-dimmable glass in the first maximum light intensity direction upon the receipt of the maintenance control signal, and transmit a second adjustment control signal toward the light-dimmable glass in the second maximum light intensity direction upon the receipt of the conversion control signal. The signal receiver which has received the first adjustment control signal is configured to control the corresponding first light dimmer to maintain the light transmittance, and the signal receiver which has received the second adjustment control signal is configured to control the corresponding second light dimmer to change its color and reduce its light transmittance.

In a possible embodiment of the present disclosure, the signal receiver which has received the second adjustment control signal is further configured to control all the light dimmers at a distance from the second light dimmer within a predetermined range to reduce their light transmittances.

In a possible embodiment of the present disclosure, the light-dimmable glass is a front windshield, a lateral windshield or a rear windshield of the vehicle.

In yet another aspect, the present disclosure provides in some embodiments a controllable light shielding method for the above-mentioned controllable light shielding device, including steps of: detecting, by the light intensity detector, a light intensity of light passing through light-dimmable glass; and adjusting, by the light transmittance controller, a light transmittance of a light-dimmable region of the light-dimmable glass in accordance with the light intensity.

In a possible embodiment of the present disclosure, the controllable light shielding method further includes: detecting, by the light intensity detector, a maximum light intensity of the light passing through the light-dimmable glass, determining a maximum light intensity direction as a light transmission direction of the light with the maximum light intensity, and outputting a transmission control signal, the maximum light intensity and the maximum light intensity direction; and upon the receipt of the transmission control signal, determining, by the light transmittance controller, a to-be-dimmed region in accordance with the maximum light intensity direction and a position of the light intensity detector, and reducing a light transmittance of the to-be-dimmed region. The to-be-dimmed region is a light-dimmable region where coincident point of the light with the maximum light intensity and the light-dimmable glass is located.

In a possible embodiment of the present disclosure, in the case that the light transmittance controller includes a signal generator and a plurality of signal receivers, the signal generator is arranged at the light intensity detector, each of the signal receivers is arranged on a respective one of the light dimmer and coordinates of a position of the signal generator coincide with coordinates of the position of the light intensity detector, the step of determining, by the light intensity detector, the maximum light intensity direction as the light transmission direction of the light with the maximum light intensity includes: determining, by the light intensity detector, the light transmission direction of the light with the maximum light intensity with its position as a point of origin. The step of, upon the receipt of the transmission control signal, determining, by the light transmittance controller, the to-be-dimmed region in accordance with the maximum light intensity direction and the position of the light intensity detector and reducing the light transmittance of the to-be-dimmed region includes: upon the receipt of the transmission control signal, transmitting, by the signal generator, an adjustment control signal toward the light-dimmable glass in the maximum light intensity direction; and controlling, by the signal receiver which has received the adjustment control signal, the corresponding light dimmer to reduce the light transmittance.

In a possible embodiment of the present disclosure, in the case that the controllable light shielding device further includes a storage circuit and a comparator, the controllable light shielding method further includes: detecting, by the light intensity detector, the maximum light intensity of the light passing through the light-dimmable glass at different detection time points, and determining the maximum light intensity direction as the light transmission direction of the light with the maximum light intensity; storing a first maximum light intensity direction, a second maximum light intensity direction and a second maximum light intensity in the storage circuit, the first maximum light intensity direction being a maximum light intensity direction determined by the light intensity detector at a previous detection time point, the second maximum light intensity direction being a maximum light intensity direction determined by the light intensity detector at a current detection time point, and the second maximum light intensity is a maximum light intensity detected by the light intensity detector at the current detection time point; comparing, by the comparator, the first maximum light intensity direction with the second maximum light intensity direction, outputting a conversion control signal in the case that the first maximum light intensity direction is different from the second maximum light intensity direction, and outputting a maintenance control signal in the case that the first maximum light intensity direction is identical to the second maximum light intensity direction; upon the receipt of the maintenance control signal, determining, by the light transmittance controller, a first to-be-dimmed region, and maintaining a light transmittance of the first to-be-dimmed region; and upon the receipt of the conversion control signal, determining, by the light transmittance controller, a second to-be-dimmed region, and reducing a light transmittance of the second to-be-dimmed region. The first to-be-dimmed region is a light-dimmable region where a coincident point of the light with the first maximum light intensity direction and the light-dimmable glass is located, and the second to-be-dimmed region is a light-dimmable region where a coincident of the light with the second maximum light intensity direction and the light-dimmable glass is located.

In a possible embodiment of the present disclosure, in the case that the light transmittance controller includes a signal generator and a plurality of signal receivers, the signal generator is arranged at the light intensity detector and each of the signal receivers is arranged on a respective one of the corresponding light dimmers, the step of determining, by the light intensity detector, the maximum light intensity direction as the light transmission direction of the light with the maximum light intensity includes: determining, by the light intensity detector, the maximum light intensity direction as the light transmission direction of the light with the maximum light intensity with its position as a point of origin. The step of, upon the receipt of the maintenance control signal, determining, by the light transmittance controller, the first to-be-dimmed region and reducing the light transmittance of the first to-be-dimmed region includes: upon the receipt of the maintenance control signal, generating, by the signal generator, a first adjustment control signal toward the light-dimmable glass in the first maximum light intensity direction; and controlling, by the signal receiver which has received the first adjustment control signal, the corresponding first light dimmer to maintain its light transmittance. The step of, upon the receipt of the conversion control signal, determining, by the light transmittance controller, the second to-be-dimmed region and reducing the light transmittance of the second to-be-dimmed region includes: upon the receipt of the conversion control signal, transmitting, by the signal generator, a second adjustment control signal toward the light-dimmable glass in the second maximum light intensity direction; and controlling, by the signal receiver which has received the second adjustment control signal, the second light dimmer where the signal receiver is located to reduce the light transmittance.

In still yet another aspect, the present disclosure provides in some embodiments a vehicle including the above-mentioned light-dimmable glass or controllable light shielding device.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 6:
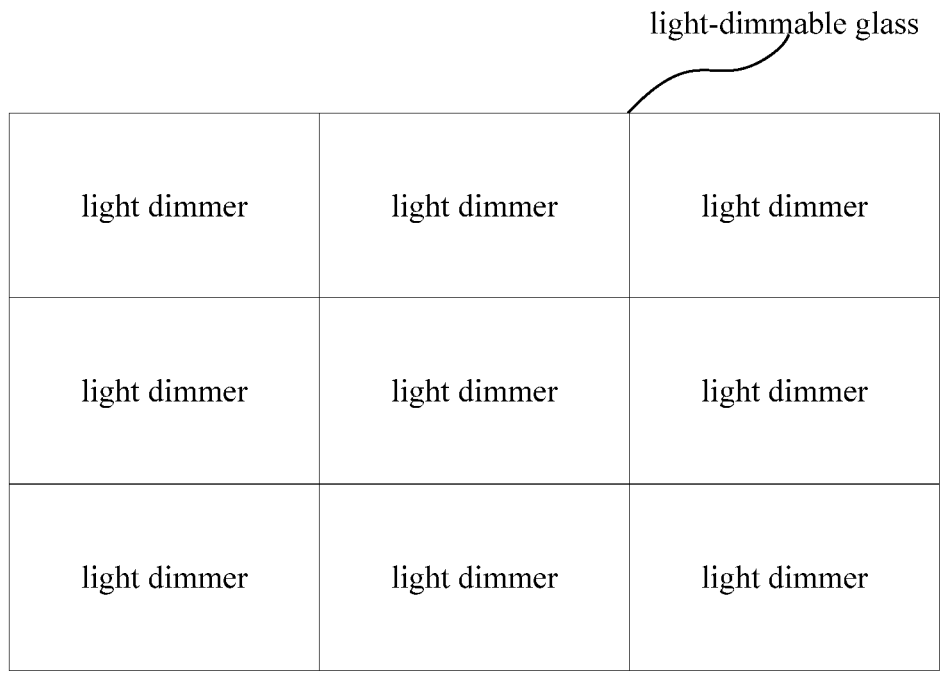
FIG. 6 is a schematic view showing light-dimmable glass according to some embodiments of the present disclosure.

As shown in FIG. 6, the present disclosure provides in some embodiments light-dimmable glass, which includes a plurality of light-dimmable regions and a plurality of light dimmers each arranged on a respective one of the plurality of light-dimmable regions. Each of the light dimmers is capable of being controlled individually so as to change its light transmittance, thereby to adjust a light transmittance of the corresponding light-dimmable region where the light dimmer is located.

In the embodiments of the present disclosure, the light transmittance of the light-dimmable region of the light-dimmable glass is capable of being adjusted individually, so it is able to achieve an automatic light-shielding function conveniently.

During the implementation, the light-dimmable glass may be applied to various scenarios where the automatic light-shielding function is required, e.g., for a vehicle where a light-shielding region is to be automatically adjusted for a driver in accordance with light entering the vehicle in the case that the vehicle is running, or for viewing room or sunshine room where a peep-proof function is to be achieved, or for any other scenario where the light transmittance is to be adjusted according to the practical need.

Figure 7:
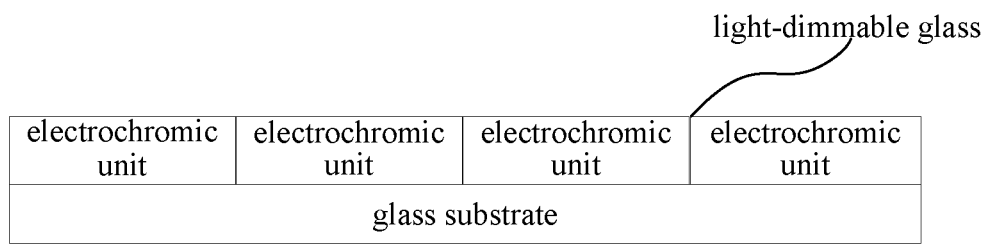
FIG. 7 is a sectional view of the light-dimmable glass according to some embodiments of the present disclosure.

To be specific, as shown in FIGS. 6 and 7, the light-dimmable glass further includes a glass substrate, the light dimmers are electrochromic units arranged in an array form on the glass substrate, and each of the electrochromic units is capable of being controlled individually so as to change its color and light transmittance.

In actual use, in one possible embodiment of the present disclosure, the light-dimmable glass may include the plurality of electrochromic units arranged in an array form on the glass substrate, and the color and the light transmittance of each electrochromic unit may be changed individually, so as to meet the different requirement of each light-dimmable region on the color and light transmittance.

Figure 8:
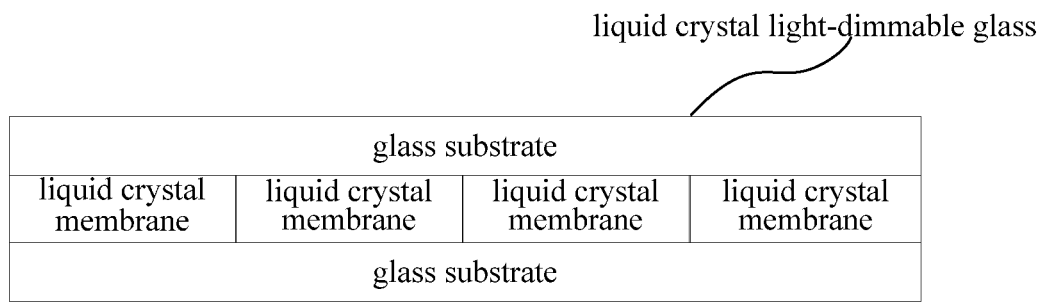
FIG. 8 is a sectional view of liquid crystal light-dimmable glass according to some embodiments of the present disclosure.

To be specific, as shown in FIGS. 6 and 8, the light-dimmable glass includes liquid crystal light-dimmable glass which includes two glass substrates arranged opposite to each other, the light dimmers are liquid crystal membranes arranged in an array form between the two glass substrates, and a light transmittance of each of the liquid crystal membranes changes along with a voltage applied to the liquid crystal membrane.

In actual use, in another possible embodiment of the present disclosure, the light-dimmable glass may also include the liquid crystal light-dimmable glass, and the light transmittance of each liquid crystal membrane of the liquid crystal light-dimmable glass may be changed individually by adjusting the voltage applied thereto, so as to meet the different requirement of each light-dimmable region on the color and light transmittance.

During the implementation, the types of the light-dimmable glass are not limited to those mentioned above, and any other light-dimmable glass shall also fall within the scope of the present disclosure, as long as its light transmittance can be adjusted.

The present disclosure further provides in some embodiments a controllable light shielding device including the above-mentioned light-dimmable glass.

Figure 1:
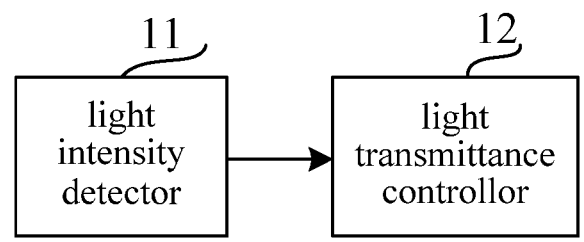
FIG. 1 is a block diagram of a controllable light shielding device according to some embodiments of the present disclosure.

As shown in FIG. 1, the controllable light shielding device further includes a light intensity detector 11 configured to detect a light intensity of light passing through the light-dimmable glass (not shown in FIG. 1), and a light transmittance controller 12 connected to the light intensity detector 11 and configured to adjust a light transmittance of a light-dimmable region in accordance with the light intensity.

In actual use, the light transmittance controller 12 may be in communication with the light-dimmable glass.

In the embodiments of the present disclosure, the light-dimmable glass may be applied to, but not limited to, vehicles, or viewing room or sunshine room where a peep-proof function is to be achieved, or any other scenario where the light transmittance is to be adjusted according to the practical need.

According to the controllable light shielding device in the embodiments of the present disclosure, the light-dimmable glass includes the plurality of light-dimmable regions capable of being controlled individually, the light intensity of the light passing through the light-dimmable glass is detected by the light intensity detector, and the light transmittance of the light-dimmable region is adjusted by the light transmittance controller in accordance with the light intensity. As a result, it is able to adjust the light transmittance of the corresponding light-dimmable region in accordance with the light intensity of the light passing through the light-dimmable glass, thereby to automatically adjust a light-shielding position of the light-dimmable glass.

To be specific, in some embodiments of the present disclosure, the light-dimmable glass may be applied to vehicles, so as to improve a driving comfort level as well as safety.

In the embodiments of the present disclosure, the light-dimmable glass may be applied to vehicles, and the light intensity detector is further configured to detect the light intensity of the light entering an interior of the vehicle through the light-dimmable glass. In actual use, the light-dimmable glass may serve as a front windshield, a lateral windshield and/or a rear windshield of the vehicle. A relationship among a light-dimmable region of the light-dimmable glass, a driver, sunlight and a driving direction will be described hereinafter by taking the light-dimmable glass as the front windshield of the vehicle as an example.

Figure 2A:
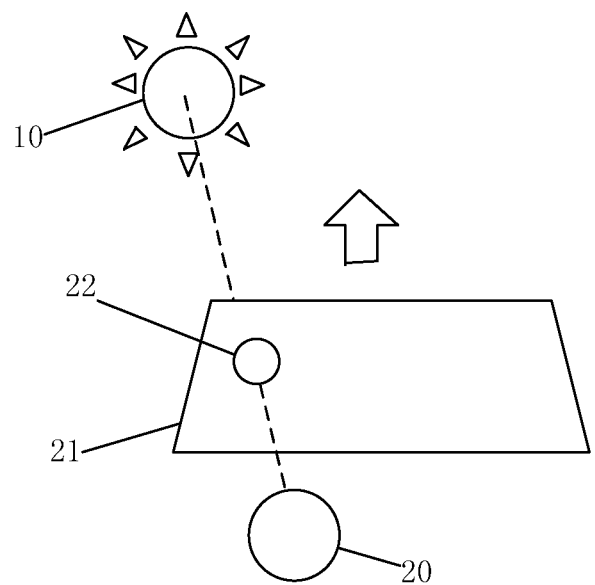
FIG. 2A is a schematic view showing a first driving scenario for the controllable light shielding device according to some embodiments of the present disclosure.

As shown in FIG. 2A, in some embodiments of the present disclosure, in the case that the light-dimmable glass 21 is applied to a vehicle, the light-dimmable glass 21 serves as a front windshield of the vehicle, the vehicle is running forward, the sun occurs in an up and left front direction of the light-dimmable glass, and the driver 20 is located behind the light-dimmable glass 21. At this time, as shown in FIG. 2A, the sunlight passing through a to-be-dimmed region 22 of the light-dimmable glass 21 to the driver 20 has a maximum light intensity, so a light transmittance of the to-be-dimmed region 22 of the light-dimmable glass 21 may be reduced, so as to prevent the sunlight from interfering with the driver 20, thereby to prevent the driver's eyes from being damaged and prevent a driving operation from being disturbed. In FIG. 2A, sign 10 represents the sun, and an arrow indicates a running direction.

Figure 2B:
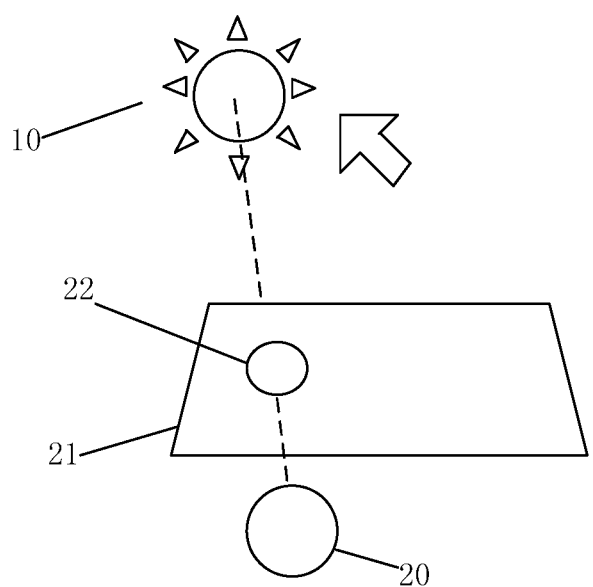
FIG. 2B is another schematic view showing a second driving scenario for the controllable light shielding device according to some embodiments of the present disclosure.

As shown in FIG. 2B, in some embodiments of the present disclosure, in the case that the light-dimmable glass 21 is applied to a vehicle, the light-dimmable glass 21 serves as a front windshield of the vehicle, the vehicle is running to the front left, the sun occurs in a up and front direction of the light-dimmable glass, and the driver 20 is located behind the light-dimmable glass 21. At this time, as shown in FIG. 2B, the sunlight passing through the to-be-dimmed region 22 of the light-dimmable glass 21 to the driver 20 has a maximum light intensity, so a light transmittance of the to-be-dimmed region 22 of the light-dimmable glass 21 may be reduced, so as to prevent the sunlight from interfering with the driver 20, thereby to prevent the driver's eyes from being damaged and prevent a driving operation from being disturbed. In FIG. 2B, sign 10 represents the sun, and an arrow indicates a running direction.

In a possible embodiment of the present disclosure, the light intensity detector is further configured to detect a maximum light intensity of the light passing through the light-dimmable glass, determine a maximum light intensity direction as a light transmission direction of the light with the maximum light intensity, output a transmission control signal, the maximum light intensity and the maximum light intensity direction. The light transmittance controller is electrically connected to the light intensity detector and further configured to, upon the receipt of the transmission control signal, determine a to-be-dimmed region in accordance with the maximum light intensity direction and a position of the light intensity detector, and reduce the light transmittance of the to-be-dimmed region. The to-be-dimmed region is a light-dimmable region where a coincident point of the light with the maximum light intensity and the light-dimmable glass is located.

According to the controllable light shielding device in the embodiments of the present disclosure, the light intensity detector detects the maximum light intensity of the light passing through the light-dimmable glass and the maximum light intensity direction, and the light transmittance controller determines the to-be-dimmed region whose light transmittance is to be reduced and then reduce the light transmittance of the to-be-dimmed region. In actual use, in some embodiments of the present disclosure, in the case that the light-dimmable glass is applied to the vehicle, the light intensity detector detects the maximum light intensity of the light passing through the light-dimmable glass into an interior of the vehicle and the maximum light intensity direction, and the light transmittance controller determines the to-be-dimmed region whose light transmittance is to be reduced to reduce the light intensity of the light irradiated onto the driver and then reduce the light transmittance of the to-be-adjusted region, so as to protect the driver.

In some embodiments of the present disclosure, in the case that the light-dimmable glass is applied to the vehicle, the light intensity detector is arranged inside the vehicle. In a possible embodiment of the present disclosure, the light intensity detector is arranged a position of the driver, i.e., it may be worn by the driver, e.g., it may be provided in the form of pendant, or arranged on a piece of sunglass worn by the driver, or any other ways, as long as it can accurately detect the light intensity of the light entering the interior of the vehicle and irradiating onto the driver.

In a possible embodiment of the present disclosure, the light transmittance controller is further configured to compare the maximum light intensity with a predetermined light intensity threshold, and in the case that the maximum light intensity is smaller than the predetermined light intensity threshold, control the light transmittance of the to-be-dimmed region to be an initial light transmittance. The initial light transmittance is a light transmittance of the to-be-dimmed region whose light transmittance has not been dimmed yet. In other words, in the case that the maximum light intensity is smaller than the predetermined light intensity threshold, it is currently unnecessary to shield the light in consideration of the external environment (or the driving environment when the scenario is for driving a vehicle), e.g., it is cloudy or night. At this time, it is unnecessary to adjust the light transmittance of the to-be-dimmed glass.

In a possible embodiment of the present disclosure, the light intensity detector is further configured to determine the maximum light intensity direction as the light transmission direction of the light with the maximum light intensity with its position as a point of origin. The light transmittance controller includes a signal generator and a plurality of signal receivers, and each of the signal receivers is arranged on a respective one of the light dimmers or a respective one of the liquid crystal membranes. The signal generator is arranged at the light intensity detector, and coordinates of a position of the signal generator coincide with coordinates of a position of the light intensity detector. The signal generator is electrically connected to the light intensity detector and configured to, upon the receipt of the transmission control signal, transmit an adjustment control signal to the light-dimmable glass in the maximum light intensity direction. The signal receiver which has received the adjustment control signal is configured to control the corresponding electrochromic unit to change its color and reduce its light transmittance, or control the corresponding liquid crystal membrane to reduce its light transmittance.

A straight line may be determined on the basis of two points, so it is able to inevitably determine one straight line on the basis of a light source emitting the light with the maximum light intensity and the light intensity detector. This straight line may cross the light-dimmable glass of the vehicle at a certain point, and the signal receiver on the electrochromic unit at this point may receive the adjustment control signal from the signal generator, so as to control the electrochromic unit at the light-dimmable region to change its color and reduce its light transmittance.

The present disclosure further provides in some embodiments a controllable light shielding device for a vehicle, which includes light-dimmable glass, a light intensity detector and a light transmittance controller. The light-dimmable glass includes a glass substrate, and a plurality of electrochromic units arranged in an array form on the glass substrate. Each of the electrochromic units is capable of being controlled individually by the light transmittance controller, so as to change its color and light transmittance. The light intensity detector is arranged at a position of the driver, and configured to detect an ambient light intensity in a 360° manner, and determine a maximum light intensity direction as a light transmission direction of light with a maximum light intensity with a position of the light intensity detector as a point of origin. The light transmittance controller includes a signal generator and a plurality of signal receivers. Each of the signal receivers is arranged on a respective one of the electrochromic units. The signal generator is arranged at the light intensity detector, and coordinates of a position of the signal generator coincide with coordinates of a position of the light intensity detector, i.e., both the signal generator and the light intensity detector are located at the origin. The signal generator is configured to transmit an adjustment control signal toward the light-dimmable glass in the maximum light intensity direction.

A straight line may be determined on the basis of two points, so it is able to inevitably determine one straight line on the basis of a light source emitting the light with the maximum light intensity and the light intensity detector. This straight line may cross the light-dimmable glass of the vehicle at a certain point. The signal receiver is arranged on each electrochromic unit of the light-dimmable glass, and once the signal receiver has received the adjustment control signal from the signal generator, a voltage may be applied to the electrochromic unit where the signal receiver is located, so as to enable the electrochromic unit to change its color and reduce its light transmittance, thereby to shield the light.

In actual use, in some embodiments of the present disclosure, the electrochromic units of the controllable light shielding device may be replaced with liquid crystal membranes, and a material of the light-dimmable glass will not be particularly defined herein.

Figure 3:
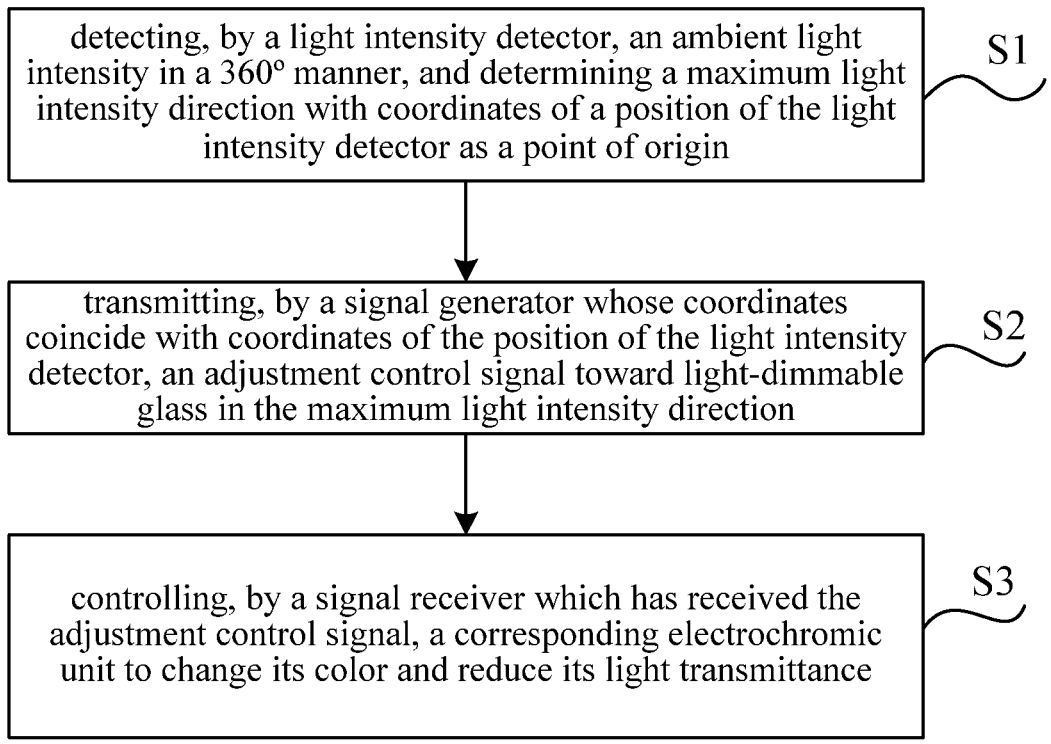
FIG. 3 is a flow chart of a working procedure of the controllable light shielding device according to some embodiments of the present disclosure.

As shown in FIG. 3, a working procedure of the controllable light shielding device may include: S1 of detecting, by the light intensity detector, the ambient light intensity in a 360° manner, and determining the maximum light intensity direction with the coordinates of the position of the light intensity detector as a point of origin; S2 of transmitting, by the signal generator whose coordinates coincide with coordinates of the position of the light intensity detector, the adjustment control signal toward the light-dimmable glass in the maximum light intensity direction; and S3 of controlling, by the signal receiver which has received the adjustment control signal, the corresponding electrochromic unit to change its color and reduce its light transmittance.

In a possible embodiment of the present disclosure, the light intensity detector is further configured to detect the maximum light intensity of the light passing through the light-dimmable glass into the interior of the vehicle at different detection time points, so as to determine the corresponding maximum light intensity direction as the light transmission direction of the light with the maximum light intensity.

Figure 4:
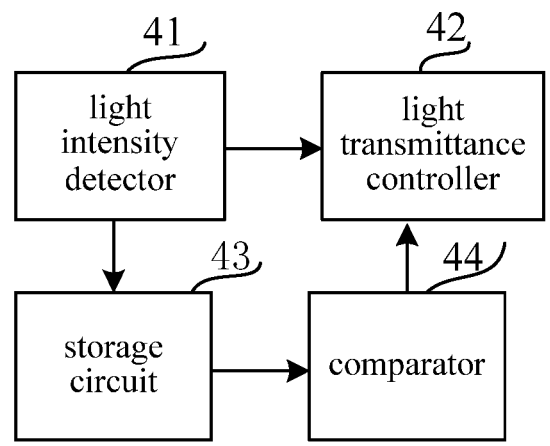
FIG. 4 is another block diagram of the controllable light shielding device according to some embodiments of the present disclosure.

As shown in FIG. 4, apart from the light-dimmable glass (not shown), the light intensity detector 41 and the light transmittance controller 42, the controllable light shielding device further includes a storage circuit 43 and a comparator 44. The storage circuit 43 is electrically connected to the light intensity detector 41 and configured to store therein a first maximum light intensity direction, a second maximum light intensity direction and a second maximum light intensity. The first maximum light intensity direction is a maximum light intensity direction determined by the light intensity detector at a previous detection time point, the second maximum light intensity direction is a maximum light intensity direction determined by the light intensity detector at a current detection time point, and the second maximum light intensity is a maximum light intensity detected by the light intensity detector at the current detection time point. The comparator 44 is electrically connected to the storage circuit 43 and the light intensity detector 41, and configured to compare the first maximum light intensity direction with the second maximum light intensity direction, output a conversion control signal in the case that the first maximum light intensity direction is different from the second maximum light intensity direction, and output a maintenance control signal in the case that the first maximum light intensity direction is identical to the second maximum light intensity direction. The light transmittance controller 42 is electrically connected to the comparator 44, and further configured to, upon the receipt of the maintenance control signal, determine a first to-be-dimmed region and maintain a light transmittance of the first to-be-dimmed region, and upon the receipt of the conversion control signal, determine a second to-be-dimmed region and reduce a light transmittance of the second to-be-dimmed region. The first to-be-dimmed region is a light-dimmable region where a coincident point of the light with the first maximum light intensity direction and the light-dimmable glass is located, and the second to-be-dimmed region is a dimmable region where a coincident point of the light with the second maximum light intensity direction and the light-dimmable glass is located.

During the operation of the controllable light shielding device in FIG. 4, the light intensity detector 41 may detect the maximum light intensity of the light passing through the light-dimmable glass into the interior of the vehicle at different detection time points, and determine the maximum light intensity direction as the light transmission direction of the light having the maximum light intensity.

The light intensity detector 41 may detect the maximum light intensity at a predetermined interval, or it may detect the maximum light intensity for many times within a time period where the light intensity is relatively large. The detection time point may be selected in accordance with the practical need or any other selection strategies, which will not be particularly defined herein.

The light intensity detector 41 may detect the maximum light intensity at the previous detection time point as the first maximum light intensity, and determine the first maximum light intensity direction as the light transmission direction of the light with the first maximum light intensity. The light intensity detector 41 may detect the maximum light intensity at the current detection time point as the second maximum light intensity, and determine the second maximum light intensity direction as the light transmission direction of the light with the second maximum light intensity. The storage circuit 43 may store therein the first maximum light intensity direction, the second maximum light intensity and the maximum light intensity detected at the current detection time point (i.e., the second maximum light intensity). The comparator 44 may compare the first maximum light intensity direction with the second maximum light intensity.

In the case that the comparator 44 determines that the second maximum light intensity direction is different from the first maximum light intensity direction, i.e., in the case that the maximum light intensity direction acquired at the current detection time point is different from the maximum light intensity direction acquired at the previous detection time point, it is necessary to re-determine the to-be-dimmed region. At this time, the comparator 44 may output the conversion control signal. Upon the receipt of the conversion control signal, the light transmittance controller 42 may determine the second to-be-dimmed region, and reduce the light transmittance of the second to-be-dimmed region. The second to-be-dimmed region is a light-dimmable region where the coincident point of the light with the second maximum light intensity direction and the light-dimmable glass is located.

In the case that the comparator 44 determines that the second maximum light intensity direction is identical to the first maximum light intensity direction, i.e., in the case that the maximum light intensity direction acquired at the current detection time point is identical to the maximum light intensity direction acquired at the previous detection time point, it is unnecessary to re-determine the to-be-dimmed region. At this time, the comparator 44 may output the maintenance control signal. Upon the receipt of the maintenance control signal, the light transmittance controller 42 may determine the first to-be-dimmed region, and maintain the light transmittance of the first to-be-dimmed region. The first to-be-dimmed region is a light-dimmable region where the coincident of the light with the first maximum light intensity direction and the light-dimmable glass is located.

In a possible embodiment of the present disclosure, the light transmittance controller is further configured to, upon the receipt of the conversion control signal, increase the light transmittance of the first to-be-dimmed region. In other words, in the case that the light intensity of the light passing through the first to-be-dimmed region is not the maximum light intensity acquired at the current detection time point, the light transmittance of the first to-be-dimmed region may be increased.

To be specific, the comparator is further configured to receive the second maximum light intensity from the storage circuit, compare the second maximum light intensity with the predetermined light intensity threshold, and output a light transmittance control signal in the case that the second maximum light intensity is smaller than the predetermined light intensity threshold. The light transmittance controller is further configured to, upon the receipt of the light transmittance control signal, control the light transmittance of the second to-be-dimmed region to be an initial light transmittance. The initial light transmittance is a light transmittance of the to-be-dimmed region whose light transmittance has not been dimmed yet.

In the case that the comparator 44 determines that the second maximum light intensity acquired at the current detection time point is smaller than the predetermined light intensity threshold, it is currently unnecessary to shield the light, e.g., it is cloudy or night. At this time, it is unnecessary to adjust the light transmittance of the second to-be-dimmed glass.

To be specific, the light intensity detector is further configured to determine the maximum light intensity direction as the light transmission direction of the light with the maximum light intensity with its position as a point of origin. The light transmittance controller includes a signal generator and a plurality of signal receivers. The signal generator is arranged at the light intensity detector, and coordinates of a position of the signal generator coincide with coordinates of a position of the light intensity detector. Each of the signal receivers is arranged on a respective one of the corresponding electrochromic units or a respective one of the liquid crystal membranes. The signal generator is electrically connected to the comparator, and configured to transmit a first adjustment control signal toward the light-dimmable glass in the first maximum light intensity direction upon the receipt of the maintenance control signal, and transmit a second adjustment control signal toward the light-dimmable glass in the second maximum light intensity direction upon the receipt of the conversion control signal. The signal receiver which has received the first adjustment control signal is configured to control the corresponding first electrochromic unit to maintain its color and light transmittance, and the signal receiver which has received the second adjustment control signal is configured to control the corresponding second electrochromic unit to change its color and reduce its light transmittance; or the signal receiver which has received the first adjustment control signal is configured to control the corresponding first liquid crystal membrane to maintain its light transmittance, and the signal receiver which has received the second adjustment control signal is configured to control the corresponding second liquid crystal membrane to reduce its light transmittance.

A straight line may be determined on the basis of two points, so it is able to inevitably determine one straight line on the basis of a light source emitting the light with the maximum light intensity and the light intensity detector. This straight line may cross the light-dimmable glass of the vehicle at a certain point, and the signal receiver on the electrochromic unit or the liquid crystal membrane at this point may receive the first adjustment control signal or the second adjustment control signal from the signal generator, so as to control the first electrochromic unit to change its color and light transmittance or control the second electrochromic unit to change its color and reduce its light transmittance, or control the first liquid crystal membrane to maintain its light transmittance or control the second liquid crystal membrane to reduce its light transmittance.

In a possible embodiment of the present disclosure, the signal receiver which has received the second adjustment control signal is further configured to control all the electrochromic units at a distance from the second electrochromic unit within a predetermined range to change their colors and reduce their light transmittances, or the signal receiver which has received the second adjustment control signal is further configured to control all the liquid crystal membranes at a distance from the second liquid crystal membrane within a predetermined range to reduce their light transmittances.

Usually, on the light-dimmable glass, the electrochromic units or liquid crystal membranes surrounding the electrochromic unit or liquid crystal membrane which has received the light with the maximum light intensity may receive the light with a relatively large light intensity, so the light transmittances of these electrochromic units or liquid crystal membranes may also be reduced accordingly, so as to further improve a light-shielding effect.

The present disclosure further provides in some embodiments a controllable light shielding device for a vehicle, which includes light-dimmable glass, a light intensity detector, a light transmittance controller, a storage circuit and a comparator. The light-dimmable glass includes a glass substrate, and a plurality of electrochromic units arranged in an array form on the glass substrate. Each of the electrochromic units is capable of being controlled individually so as to change its color and light transmittance. The light intensity detector is arranged at a position of the driver, and configured to detect an ambient light intensity in a 360° manner, and determine a maximum light intensity direction as a light transmission direction of light with a maximum light intensity with a position of the light intensity detector as a point of origin. The light intensity detector may be worn by the driver, e.g., in the form of a pendent. The light transmittance controller includes a signal generator and a plurality of signal receivers. The signal generator is arranged at the light intensity detector, and coordinates of a position of the signal generator coincide with coordinates of a position of the light intensity detector. Each of the signal receivers is arranged on a respective one of the electrochromic units. The light intensity detector is further configured to determine a first maximum light intensity, a first maximum light intensity direction, a second maximum light intensity and a second maximum light intensity direction. The first maximum light intensity is a maximum light intensity detected by the light intensity detector at a previous detection time point, and the first maximum light intensity direction is a direction of light with the first maximum light intensity. The second maximum light intensity is a maximum light intensity detected by the light intensity detector at a current detection time point, and the second maximum light intensity direction is a direction of light with the second maximum light intensity. The storage circuit is configured to store therein the first maximum light intensity direction and the second maximum light intensity direction. The comparator is configured to compare the first maximum light intensity direction with the second maximum light intensity direction. In the case that the comparator determines that the first maximum light intensity direction is identical to the second maximum light intensity direction, a maintenance control signal is outputted, and in the case that the comparator determines that the first maximum light intensity direction is different from the second maximum light intensity direction, a conversion control signal is outputted. The signal generator is electrically connected to the comparator, and configured to, upon the receipt of the maintenance control signal, transmit a first adjustment control signal toward the light-dimmable glass in the first maximum light intensity direction, and upon the receipt of the conversion control signal, transmit a second adjustment control signal toward the light-dimmable glass in the second maximum light intensity direction. The signal generator is in communication with the plurality of signal receivers. The signal receiver which has received the first adjustment control signal is configured to control a corresponding first electrochromic unit to maintain its color and light transmittance. The signal receiver which has received the second adjustment control signal is configured to control a corresponding second electrochromic unit to change its color and reduce its light transmittance.

In actual use, the electrochromic units of the controllable light shielding device in FIG. 4 may also be replaced with liquid crystal membranes, and a material of the light-dimmable glass will not be particularly defined herein.

Figure 5:
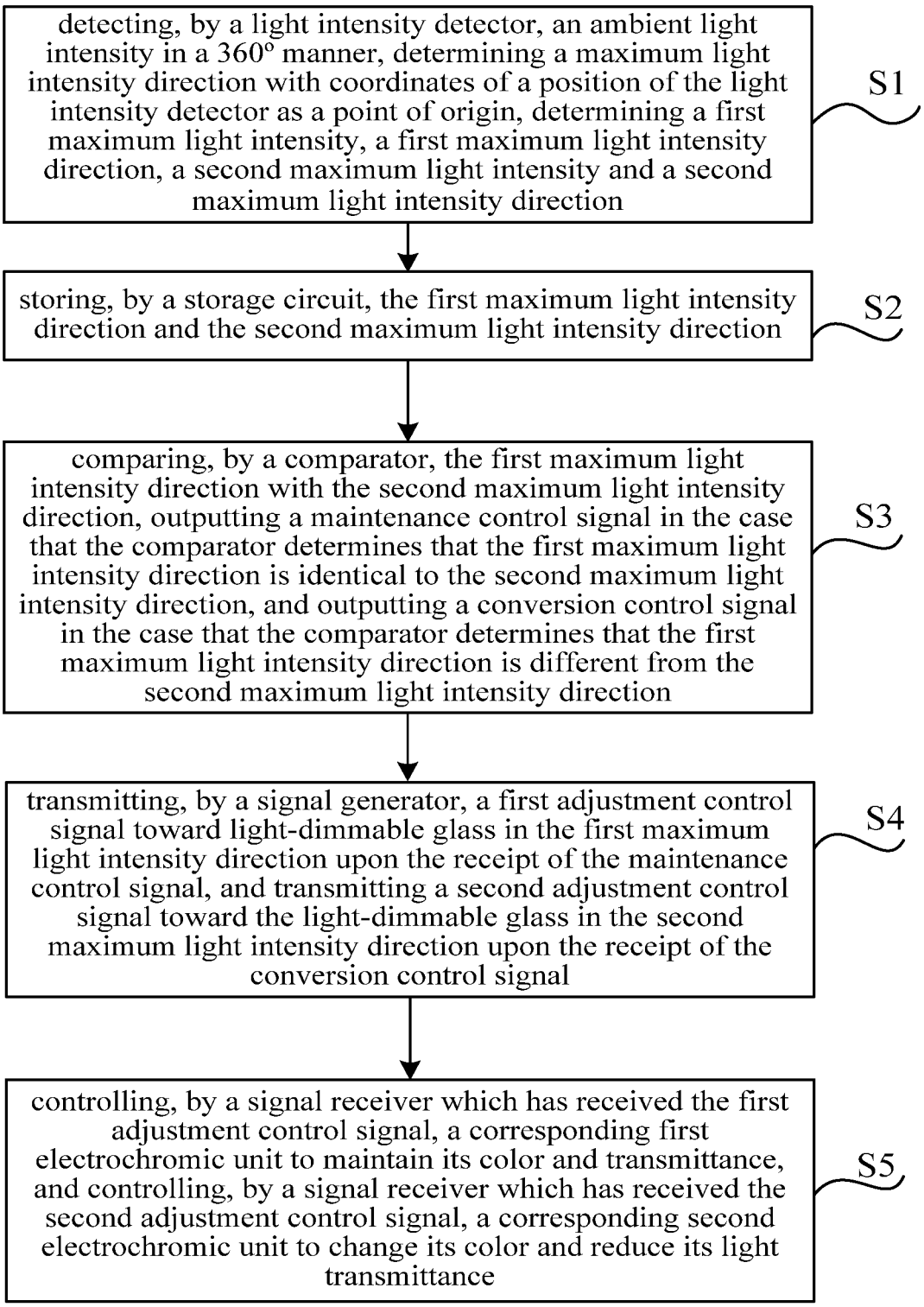
FIG. 5 is another flow chart of the controllable light shielding method according to some embodiments of the present disclosure.

As shown in FIG. 5, a working procedure of the controllable light shielding device may include: S1 of detecting, by the light intensity detector, an ambient light intensity in a 360° manner, determining the maximum light intensity direction with the coordinates of the position of the light intensity detector as a point of origin, determining the first maximum light intensity, the first maximum light intensity direction, the second maximum light intensity and the second maximum light intensity direction; S2 of storing, by the storage circuit, the first maximum light intensity direction and the second maximum light intensity direction; S3 of comparing, by the comparator, the first maximum light intensity direction with the second maximum light intensity direction, outputting the maintenance control signal in the case that the first maximum light intensity direction is identical to the second maximum light intensity direction, and outputting the conversion control signal in the case that the first maximum light intensity direction is different from the second maximum light intensity direction; S4 of transmitting, by the signal generator, the first adjustment control signal toward the light-dimmable glass in the first maximum light intensity direction upon the receipt of the maintenance control signal, and transmitting the second adjustment control signal toward the light-dimmable glass in the second maximum light intensity direction upon the receipt of the conversion control signal; and S5 of controlling, by the signal receiver which has received the first adjustment control signal, the corresponding first electrochromic unit to maintain its color and transmittance, and controlling, by the signal receiver which has received the second adjustment control signal, the corresponding second electrochromic unit to change its color and reduce its light transmittance.

In other words, in the case that the second maximum light intensity direction acquired at the current detection time point is identical to the first maximum light intensity direction acquired at the previous detection time point, it is unnecessary to re-determine the to-be-dimmed region, and at this time, the light transmittance of the first to-be-dimmed region may be maintained. In the case that the second maximum light intensity direction acquired at the current detection time point is different from the first maximum light intensity direction acquired at the previous detection time point, it is necessary to re-determine the to-be-dimmed region, and at this time, the light transmittance of the second to-be-dimmed region may be reduced.

The present disclosure further provides in some embodiments a controllable light shielding method for the above-mentioned controllable light shielding device, which includes steps of: detecting, by the light intensity detector, a light intensity of light passing through light-dimmable glass; and adjusting, by the light transmittance controller, a light transmittance of a light-dimmable region of the light-dimmable glass according to the light intensity.

In the embodiments of the present disclosure, the controllable light shielding method may be applied to, but not limited to, vehicles, or viewing room or sunshine room where a peep-proof function is to be achieved, or any other scenario where the light transmittance is to be adjusted according to the practical need.

To be specific, the controllable light shielding method further includes: detecting, by the light intensity detector, a maximum light intensity of the light passing through the light-dimmable glass, determining a maximum light intensity direction as a light transmission direction of the light with the maximum light intensity, and outputting a transmission control signal, the maximum light intensity and the maximum light intensity direction; and upon the receipt of the transmission control signal, determining, by the light transmittance controller, a to-be-dimmed region in accordance with the maximum light intensity direction and a position of the light intensity detector, and reducing a light transmittance of the to-be-dimmed region. The to-be-dimmed region is a light-dimmable region where coincident point of the light with the maximum light intensity and the light-dimmable glass is located.

In a possible embodiment of the present disclosure, in the case that the light transmittance controller includes a signal generator and a plurality of signal receivers, the signal generator is arranged at the light intensity detector, each of the signal receivers is arranged on a respective one of the light dimmers or a respective one of the liquid crystal membranes, and coordinates of a position of the signal generator coincide with coordinates of the position of the light intensity detector, the step of determining, by the light intensity detector, the maximum light intensity direction as the light transmission direction of the light with the maximum light intensity includes: determining, by the light intensity detector, the light transmission direction of the light with the maximum light intensity with its position as a point of origin. The step of, upon the receipt of the transmission control signal, determining, by the light transmittance controller, the to-be-dimmed region in accordance with the maximum light intensity direction and the position of the light intensity detector and reducing the light transmittance of the to-be-dimmed region includes: upon the receipt of the transmission control signal, transmitting, by the signal generator, an adjustment control signal toward the light-dimmable glass in the maximum light intensity direction; and controlling, by the signal receiver which has received the adjustment control signal, the corresponding electrochromic unit or liquid crystal membrane to change its color and reduce its light transmittance.

In a possible embodiment of the present disclosure, in the case that the controllable light shielding device further includes a storage circuit and a comparator, the controllable light shielding method further includes: detecting, by the light intensity detector, the maximum light intensity of the light passing through the light-dimmable glass at different detection time points, and determining the corresponding maximum light intensity direction as the light transmission direction of the light with the maximum light intensity; storing a first maximum light intensity direction, a second maximum light intensity direction and a second maximum light intensity in the storage circuit, the first maximum light intensity direction being a maximum light intensity direction determined by the light intensity detector at a previous detection time point, the second maximum light intensity direction being a maximum light intensity direction determined by the light intensity detector at a current detection time point, and the second maximum light intensity is a maximum light intensity detected by the light intensity detector at the current detection time point; comparing, by the comparator, the first maximum light intensity direction with the second maximum light intensity direction, outputting a conversion control signal in the case that the first maximum light intensity direction is different from the second maximum light intensity direction, and outputting a maintenance control signal in the case that the first maximum light intensity direction is identical to the second maximum light intensity direction; upon the receipt of the maintenance control signal, determining, by the light transmittance controller, a first to-be-dimmed region, and maintaining a light transmittance of the first to-be-dimmed region; and upon the receipt of the conversion control signal, determining, by the light transmittance controller, a second to-be-dimmed region, and reducing a light transmittance of the second to-be-dimmed region. The first to-be-dimmed region is a light-dimmable region where a coincident point of the light with the first maximum light intensity direction and the light-dimmable glass is located, and the second to-be-dimmed region is a light-dimmable region where a coincident of the light with the second maximum light intensity direction and the light-dimmable glass is located.

In a possible embodiment of the present disclosure, in the case that the light transmittance controller includes a signal generator and a plurality of signal receivers, the signal generator is arranged at the light intensity detector and each of the signal receivers is arranged on a respective one of the electrochromic units or a respective one of the liquid crystal membranes, the step of determining, by the light intensity detector, the maximum light intensity direction as the light transmission direction of the light with the maximum light intensity includes: determining, by the light intensity detector, the maximum light intensity direction as the light transmission direction of the light with the maximum light intensity with its position as a point of origin. The step of, upon the receipt of the maintenance control signal, determining, by the light transmittance controller, the first to-be-dimmed region and reducing the light transmittance of the first to-be-dimmed region includes: upon the receipt of the maintenance control signal, transmitting, by the signal generator, a first adjustment control signal toward the light-dimmable glass in the first maximum light intensity direction, and controlling, by the signal receiver which has received the first adjustment control signal, the corresponding first electrochromic unit to maintain its color and light transmittance; or upon the receipt of the maintenance control signal, transmitting, by the signal generator, the first adjustment control signal toward the light-dimmable glass in the first maximum light intensity direction, and controlling, by the signal receiver which has received the first adjustment control signal, the corresponding first liquid crystal membrane to maintain its light transmittance. The step of, upon the receipt of the conversion control signal, determining, by the light transmittance controller, the second to-be-dimmed region and reducing the light transmittance of the second to-be-dimmed region includes: upon the receipt of the conversion control signal, transmitting, by the signal generator, a second adjustment control signal toward the light-dimmable glass in the second maximum light intensity direction, and controlling, by the signal receiver which has received the second adjustment control signal, the second electrochromic unit where the signal receiver is located to change its color and reduce its light transmittance; or upon the receipt of the conversion control signal, transmitting, by the signal generator, the second adjustment control signal toward the light-dimmable glass in the second maximum light intensity direction, and controlling, by the signal receiver which has received the second adjustment control signal, the corresponding second liquid crystal membrane to reduce the light transmittance.

Based on an identical inventive concept, the present disclosure further provides in some embodiments a vehicle including the above-mentioned controllable light shielding device.

The vehicle may be of various types and purposes, such as automobile, truck or bus. Because the vehicle includes the above-mentioned controllable light shielding device, it is able for the vehicle to solve the above-mentioned technical problem and achieve the above-mentioned technical effect.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A controllable light shielding device, comprising:
a light-dimmable glass comprising a plurality of light-dimmable regions and a plurality of light dimmers each arranged on a respective one of the plurality of light-dimmable regions; wherein each of the light dimmers is capable of being controlled individually to change a light transmittance of the light dimmer, to enable to adjust a light transmittance of a corresponding light-dimmable region where the light dimmer is arranged;
a light intensity detector configured to detect a light intensity of light passing through the light-dimmable glass; and
a light transmittance controller configured to adjust the light transmittance of the light-dimmable region in accordance with the light intensity;
wherein the light intensity detector is further configured to detect a maximum light intensity of the light passing through the light-dimmable glass, determine a maximum light intensity direction as a light transmission direction of the light with the maximum light intensity, and output a transmission control signal, the maximum light intensity and the maximum light intensity direction; and
the light transmittance controller is electrically connected to the light intensity detector and further configured to, upon the receipt of the transmission control signal, determine a to-be-dimmed region in accordance with the maximum light intensity direction and a position of the light intensity detector, and reduce the light transmittance of the to-be-dimmed region, wherein the tobe-dimmed region is a light-dimmable region where a coincident point of the light with the maximum light intensity and the light-dimmable glass is located;

wherein the light transmittance controller is further configured to compare the maximum light intensity with a predetermined light intensity threshold, and in the case that the maximum light intensity is smaller than the predetermined light intensity threshold, control the light transmittance of the to-be-dimmed region to be an initial light transmittance; and the initial light transmittance is a light transmittance of the to-be-dimmed region whose light transmittance has not been dimmed yet;

the initial light transmittance is a maximum light transmittance;

wherein the light intensity detection unit is further configured to detect the maximum light intensity of the light passing through the light-dimmable glass at different detection time points, to determine a corresponding maximum light intensity direction as a light transmission direction of the light with the maximum light intensity;

the controllable light shielding device further comprises a storage unit and a comparison unit;

the storage unit is electrically connected to the light intensity detection unit and configured to store therein a first maximum light intensity direction, a second maximum light intensity direction and a second maximum light intensity;

the first maximum light intensity direction is a maximum light intensity direction determined by the light intensity detection unit at a previous detection time point, the second maximum light intensity direction is a maximum light intensity direction determined by the light intensity detection unit at a current detection time point, and the second maximum light intensity is a maximum light intensity detected by the light intensity detection unit at the current detection time point;

the comparison unit is electrically connected to the storage unit and the light intensity detection unit, and configured to compare the first maximum light intensity direction with the second maximum light intensity direction, output a conversion control signal in the case that the first maximum light intensity direction is different from the second maximum light intensity direction, and output a maintenance control signal in the case that the first maximum light intensity direction is identical to the second maximum light intensity direction;

the light transmittance control unit is electrically connected to the comparison unit, and further configured to, upon the receipt of the maintenance control signal, determine a first to-be-dimmed region and maintain a light transmittance of the first to-be-dimmed region, and upon the receipt of the conversion control signal, determine a second to-be-dimmed region and reduce a light transmittance of the second to-be-dimmed region; and the first to-be-dimmed region is a light-dimmable region where a coincident point of the light with the first maximum light intensity direction and the light-dimmable glass is located, and the second to-be-dimmed region is a dimmable region where a coincident point of the light with the second maximum light intensity direction and the light-dimmable glass is located.

2. The controllable light shielding device according to claim 1, wherein in the case that the controllable light shielding device is applied to a vehicle, the light intensity detector is further configured to detect the light intensity of the light passing through the light-dimmable glass into an interior of the vehicle.

3. The controllable light shielding device according to claim 1, wherein the light intensity detector is further configured to determine the light transmission direction of the light with the maximum light intensity by taking a position of the light intensity detector as a point of origin;

the light transmittance controller comprises a signal generator and a plurality of signal receivers, and each of the signal receivers is arranged on a respective one of the light dimmers;

the signal generator is arranged at the light intensity detector, and coordinates of a position of the signal generator coincide with coordinates of a position of the light intensity detector;

the signal generator is electrically connected to the light intensity detector and configured to, upon the receipt of the transmission control signal, transmit an adjustment control signal to the light-dimmable glass in the maximum light intensity direction; and the signal receiver which has received the adjustment control signal is configured to control the respective light dimmer to reduce the light transmittance.

4. The controllable light shielding device according to claim 1, wherein the light transmittance controller is further configured to, upon the receipt of the conversion control signal, increase the light transmittance of the first to-be-dimmed region.

5. The controllable light shielding device according to claim 1, wherein the comparator is further configured to receive the second maximum light intensity from the storage circuit, compare the second maximum light intensity with the predetermined light intensity threshold, and output a light transmittance control signal in the case that the second maximum light intensity is smaller than the predetermined light intensity threshold;

the light transmittance controller is further configured to, upon the receipt of the light transmittance control signal, control the light transmittance of the second to-be-dimmed region to be an initial light transmittance; and the initial light transmittance is a light transmittance of the to-be-dimmed region whose light transmittance has not been dimmed yet.

6. The controllable light shielding device according to claim 1, wherein the light intensity detector is further configured to determine a corresponding maximum light intensity direction as the light transmission direction of the light with the maximum light intensity by taking a position of the light intensity detector as a point of origin;

the light transmittance controller comprises a signal generator and a plurality of signal receivers;

the signal generator is arranged at the light intensity detector, and coordinates of a position of the signal generator coincide with coordinates of a position of the light intensity detector;

each of the signal receivers is arranged on a respective one of the light dimmers;

the signal generator is electrically connected to the comparator, and configured to transmit a first adjustment control signal toward the light-dimmable glass in the first maximum light intensity direction upon the receipt of the maintenance control signal, and transmit a second adjustment control signal toward the light-dimmable glass in the second maximum light intensity direction upon the receipt of the conversion control signal; and the signal receiver which has received the first adjustment control signal is configured to control the respective first light dimmer to maintain the light transmittance of the respective first light dimmer, and the signal receiver which has received the second adjustment control signal is configured to control the respective second light dimmer to reduce the light transmittance of the respective second light dimmer.

7. The controllable light shielding device according to claim 6, wherein the signal receiver which has received the second adjustment control signal is further configured to control all of electrochromic units each at a distance from the respective second light dimmer within a predetermined range to reduce their light transmittances.

8. The controllable light shielding device according to claim 2, wherein the light-dimmable glass is a front windshield, a lateral windshield or a rear windshield of the vehicle.

9. A controllable light shielding method for the controllable light shielding device according to claim 1, wherein the controllable light shielding method comprises:

detecting, by the light intensity detector, the light intensity of the light passing through the light-dimmable glass; and adjusting, by the light transmittance controller, the light transmittance of the light-dimmable region of the light-dimmable glass in accordance with the light intensity.

10. The controllable light shielding method according to claim 9, further comprising:

detecting, by the light intensity detector, a maximum light intensity of the light passing through the light-dimmable glass, determining, by the light intensity detector, a maximum light intensity direction as a light transmission direction of the light with the maximum light intensity, and outputting, by the light intensity detector, a transmission control signal, the maximum light intensity and the maximum light intensity direction; and upon the receipt of the transmission control signal by the light transmittance controller, determining, by the light transmittance controller, a to-be-dimmed region in accordance with the maximum light intensity direction and a position of the light intensity detector, and reducing, by the light transmittance controller, a light transmittance of the to-be-dimmed region, wherein the to-be-dimmed region is a light-dimmable region where coincident point of the light with the maximum light intensity and the light-dimmable glass is located.

11. The controllable light shielding method according to claim 10, wherein in the case that the light transmittance controller comprises a signal generator and a plurality of signal receivers, the signal generator is arranged at the light intensity detector, each of the signal receivers is arranged on a respective one of the light dimmers, and coordinates of a position of the signal generator coincide with coordinates of the position of the light intensity detector, the step of determining, by the light intensity detector, the maximum light intensity direction as the light transmission direction of the light with the maximum light intensity comprises: determining, by the light intensity detector, the light transmission direction of the light with the maximum light intensity by taking a position of the light intensity detector as a point of origin, and the step of, upon the receipt of the transmission control signal by the light transmittance controller, determining, by the light transmittance controller, the to-be-dimmed region in accordance with the maximum light intensity direction and the position of the light intensity detector, and reducing, by the light transmittance controller, the light transmittance of the to-be-dimmed region comprises: upon the receipt of the transmission control signal by the signal generator, transmitting, by the signal generator, an adjustment control signal toward the light-dimmable glass in the maximum light intensity direction; and controlling, by the signal receiver which has received the adjustment control signal, the respective light dimmer to reduce the light transmittance of the respective light dimmer.

12. The controllable light shielding method according to claim 9, wherein in the case that the controllable light shielding device further comprises a storage circuit and a comparator, the controllable light shielding method further comprises:

detecting, by the light intensity detector, the maximum light intensity of the light passing through the light-dimmable glass at different detection time points, and determining, by the light intensity detector, a corresponding maximum light intensity direction as a light transmission direction of the light with the maximum light intensity;

storing a first maximum light intensity direction, a second maximum light intensity direction and a second maximum light intensity in the storage circuit, wherein the first maximum light intensity direction is a maximum light intensity direction determined by the light intensity detector at a previous detection time point, the second maximum light intensity direction is a maximum light intensity direction determined by the light intensity detector at a current detection time point, and the second maximum light intensity is a maximum light intensity detected by the light intensity detector at the current detection time point;

comparing, by the comparator, the first maximum light intensity direction with the second maximum light intensity direction, outputting, by the comparator, a conversion control signal in the case that the first maximum light intensity direction is different from the second maximum light intensity direction, and outputting, by the comparator, a maintenance control signal in the case that the first maximum light intensity direction is identical to the second maximum light intensity direction;

upon the receipt of the maintenance control signal by the light transmittance controller, determining, by the light transmittance controller, a first to-be-dimmed region, and maintaining, by the light transmittance controller, a light transmittance of the first to-be-dimmed region; and upon the receipt of the conversion control signal by the light transmittance controller, determining, by the light transmittance controller, a second to-be-dimmed region, and reducing, by the light transmittance controller, a light transmittance of the second to-be-dimmed region, wherein the first to-be-dimmed region is a light-dimmable region where a coincident point of the light with the first maximum light intensity direction and the light-dimmable glass is located, and the second to-be-dimmed region is a light-dimmable region where a coincident point of the light with the second maximum light intensity direction and the light-dimmable glass is located.

13. The controllable light shielding method according to claim 12, wherein in the case that the light transmittance controller comprises a signal generator and a plurality of signal receivers, the signal generator is arranged at the light intensity detector, and each of the signal receivers is arranged on a respective one of the light dimmers, the step of determining, by the light intensity detector, the corresponding maximum light intensity direction as the light transmission direction of the light with the maximum light intensity comprises: determining, by the light intensity detector, the corresponding maximum light intensity direction as the light transmission direction of the light with the maximum light intensity by taking a position of the light intensity detector as a point of origin, the step of, upon the receipt of the maintenance control signal by the light transmittance controller, determining, by the light transmittance controller, the first to-be-dimmed region, and reducing, by the light transmittance controller, the light transmittance of the first to-be-dimmed region comprises: upon the receipt of the maintenance control signal by the signal generator, transmitting, by the signal generator, a first adjustment control signal toward the light-dimmable glass in the first maximum light intensity direction; and controlling, by the signal receiver which has received the first adjustment control signal, the respective first light dimmer to maintain a light transmittance of the respective first light dimmer, and the step of, upon the receipt of the conversion control signal by the light transmittance controller, determining, by the light transmittance controller, the second to-be-dimmed region, and reducing, by the light transmittance controller, the light transmittance of the second to-be-dimmed region comprises: upon the receipt of the conversion control signal by the signal generator, transmitting, by the signal generator, a second adjustment control signal toward the light-dimmable glass in the second maximum light intensity direction; and controlling, by the signal receiver which has received the second adjustment control signal, a second light dimmer where the signal receiver is located to reduce the light transmittance.

14. A vehicle comprising the controllable light shielding device according to claim 1.

15. The controllable light shielding device according to claim 1, wherein the light-dimmable glass further comprises a glass substrate, the plurality of light dimmers are electrochromic units arranged in an array form on the glass substrate, and each of the electrochromic units is capable of being controlled individually to change color and a light transmittance of the electrochromic unit.

16. The controllable light shielding device according to claim 1, wherein the light-dimmable glass comprises liquid crystal light-dimmable glass which comprises two glass substrates arranged opposite to each other, the light dimmers are liquid crystal membranes arranged in an array form between the two glass substrates, and a light transmittance of each of the liquid crystal membranes is capable of being changed by adjusting a voltage applied to the liquid crystal membrane.

* * * * *